US007423243B2

(12) United States Patent
Reusche et al.

(10) Patent No.: US 7,423,243 B2
(45) Date of Patent: Sep. 9, 2008

(54) HEATING SYSTEM AND METHOD

(75) Inventors: Thomas K. Reusche, Elburn, IL (US); Philip E. Chumbley, Aurora, IL (US)

(73) Assignee: Allied Precision Industries, Inc., Elburn, IL (US)

(*) Notice: Subject to any disclaimer, the term of this patent is extended or adjusted under 35 U.S.C. 154(b) by 44 days.

(21) Appl. No.: 11/679,448

(22) Filed: Feb. 27, 2007

(65) Prior Publication Data
US 2007/0204857 A1   Sep. 6, 2007

Related U.S. Application Data

(60) Provisional application No. 60/779,504, filed on Mar. 6, 2006, provisional application No. 60/779,168, filed on Mar. 3, 2006.

(51) Int. Cl.
    H05B 1/02         (2006.01)
(52) U.S. Cl. .................. 219/494; 219/497; 219/501; 119/69.5; 119/73
(58) Field of Classification Search .................. 219/494, 219/497, 499, 501, 505, 483–486; 119/69.5, 119/73
See application file for complete search history.

(56) References Cited

U.S. PATENT DOCUMENTS

| | | | |
|---|---|---|---|
| 2,877,051 A | 3/1959 | Cushman | |
| 3,836,130 A | 9/1974 | Earhart | |
| 4,166,086 A | 8/1979 | Wright | |
| 4,599,973 A | 7/1986 | Ward | |
| 4,908,501 A * | 3/1990 | Arnold, III | .................. 219/438 |
| 5,079,784 A * | 1/1992 | Rist et al. | .................. 4/541.2 |
| 5,303,585 A | 4/1994 | Lichte | |
| 5,336,399 A | 8/1994 | Kajisono | |
| 5,782,035 A * | 7/1998 | Locke et al. | .................. 47/79 |
| 5,980,100 A | 11/1999 | Haegeman | |
| 6,125,696 A | 10/2000 | Hannan et al. | |
| 6,484,666 B1 | 11/2002 | Reusche | |
| 6,597,863 B2 | 7/2003 | Koskey, Jr. | |
| 6,640,747 B2 | 11/2003 | Reusche | |
| 2003/0101942 A1 * | 6/2003 | Reusche | .................. 119/69.5 |
| 2005/0121645 A1 | 6/2005 | Prescott | |
| 2006/0096971 A1 | 5/2006 | Resuche | |
| 2006/0249505 A1 | 11/2006 | Resuche | |
| 2006/0289466 A1 | 12/2006 | Reusche | |
| 2006/0289467 A1 | 12/2006 | Reusche | |

FOREIGN PATENT DOCUMENTS

| | | |
|---|---|---|
| DE | 19645970 A1 | 5/1998 |
| WO | 0957132 A1 | 12/1998 |
| WO | 2006026624 A1 | 3/2006 |

* cited by examiner

*Primary Examiner*—Mark Paschall
(74) *Attorney, Agent, or Firm*—McAndrews, Held & Malloy, Ltd.

(57) ABSTRACT

A fluid heating system includes a fluid receptacle having a fluid reservoir, and a heating control system configured to heat fluid retained within the fluid reservoir. The heating control system includes a processing unit, at least one fluid temperature sensor positioned on or within the fluid receptacle, a heating element configured to heat fluid within the fluid reservoir, and a power switch disposed within an electrical path between the heating element and the processing unit. The processing unit is configured to selectively activate and deactivate the heating element through the power switch based on the fluid temperature detected by the fluid temperature sensor.

21 Claims, 7 Drawing Sheets

HEATING SYSTEM AND METHOD

RELATED APPLICATIONS

The present application relates to and claims priority from (1) U.S. Provisional Application No. 60/779,168, entitled "Microprocessor Control of Heated Pet Mats, Beds, and Blankets," filed on Mar. 3, 2006, which is hereby incorporated by reference in its entirety; and (2) U.S. Provisional Application No. 60/779,504, entitled "Microprocessor Control of Heated Birdbaths," filed on Mar. 6, 2006, which is also hereby incorporated by reference in its entirety.

BACKGROUND OF THE INVENTION

Embodiments of the present invention generally relate to a heating system and method, and more particularly to a system and method of heating a fluid receptacle, such as a birdbath, pet mats, beds or blankets.

Electrically heated birdbaths have existed for some time. A typical heated birdbath includes a mechanical thermostat that is operable to activate a heating element when the ambient air temperature falls to a level in which ice may form. Because of the hysteresis in the thermostat, the heat element typically activates at a temperature approaching the freezing point of water and deactivates after the water has been heated to a temperature typically around 20° F. higher than the activation temperature. While this procedure is adequate for preventing the formation of ice, it is an inefficient process.

Mechanical thermostats are typically specified with an uncertainty in the activation/deactivation temperatures up to 7° F. A thermostat selected to activate at 40° F. may actually activate at 33° F. Because there is often a temperature gradient of several degrees between the top and bottom of a birdbath or livestock water tank or trough, a sinking deicer with an actual activation temperature of 33° F. may not keep ice from forming on the surface of the water.

Additionally, heated pet devices, such as beds, mats, and blankets have been known for a number of years. A typical heated pet device includes an electrical heating element, usually a resistance wire, that is incorporated into the body of a pet mat or blanket. In some instances, such as with respect to a pet bed, the heating element may be a foil or vinyl protected sheet that is sandwiched between cushioning layers. Other items, such as heated pet sweaters that include a battery powered heating element, may be used to provide extra warmth for an animal, such as a cat or dog.

The heating element is typically run by an AC circuit, or at a lower voltage as supplied by a transformer. In the case of a portable device, such as a sweater, the heating element may be powered by batteries. A thermostat is also typically connected in series with the heating element to deactivate the heating element if the temperature exceeds a pre-defined limit.

Thermostats are often inaccurate, however, with respect to activation and deactivation temperatures, as discussed above. Additionally, heated pet devices do not typically include any component configured to regulate the temperature according to ambient conditions or according to the body heat of the animal. Thus, a heated mat, for instance, may be comfortable for an animal at one instance, but undesirably hot at another.

Thus, a need exists for an efficient system and method of heating water within a water receptacle, such as a birdbath. A need also exists for accurately controlling the temperature cycle of a heating device. Additionally, a need exists for an efficient system and method for monitoring and adjusting heated pet devices.

SUMMARY OF THE INVENTION

Certain embodiments of the present invention provide a system that includes a fluid receptacle, such as a birdbath, and a heating control system. The fluid receptacle includes a fluid reservoir that is configured to retain fluid.

The heating control system is configured to heat the fluid retained within the fluid reservoir. The heating control system includes a processing unit, and at least one fluid temperature sensor positioned on or within at least a portion of the fluid receptacle. The at least one fluid temperature sensor is in communication with the processing unit, and is configured to detect a temperature of the fluid within the fluid reservoir.

The heating control system also includes a heating element configured to heat the fluid within the fluid reservoir, and a power switch disposed within an electrical path between the heating element and the processing unit. The processing unit is configured to activate the heating element through the power switch when the at least one fluid temperature sensor detects that the temperature of the fluid within the fluid reservoir is below a first temperature threshold. The processing unit is also configured to deactivate the heating element through the power switch when the at least one fluid temperature sensor detects that the temperature of the fluid within the fluid reservoir is above a second temperature threshold.

The heating element may be embedded in the fluid receptacle. The fluid receptacle may include an inner receptacle and an outer receptacle, wherein the heating element is sandwiched between the inner receptacle and the outer receptacle.

The power switch may include a semiconductor switch, such as a triac. Thus, the processing unit may be configured to activate the heating element in a proportional mode.

The system may also include at least one air temperature sensor in communication with the processing unit. The processing unit may be configured to selectively activate and deactivate the heating element based on a temperature of ambient air.

The system may also include at least one heating element temperature sensor in communication with the processing unit. The processing unit may be configured to prevent the heating element from activating based on a temperature of the heating element.

The system may also include at least one fluid level sensor in communication with the processing unit. The processing unit may be configured to prevent the heating element from activating based on a fluid level within the fluid reservoir.

Certain embodiments of the present invention provide a pet warming system that includes a pet device, such as a pet mat, pet bed, blanket, or sweater, and a heating control system secured on and/or within the pet device. The heating control system is configured to heat the pet device.

The heating control system includes a processing unit, at least one temperature sensor in communication with the processing unit, a heating member, and a power switch. The at least one temperature sensor is configured to detect a temperature of at least one of the pet device, ambient air, or a pet adjacent the pet device.

The power switch is disposed within an electrical path between the heating member and the processing unit. The processing unit is configured to activate the heating member through the power switch when the at least one temperature sensor detects that the temperature is below a first temperature threshold. The processing unit is also configured to deactivate the heating member through the power switch when the at least one temperature sensor detects that the temperature is above a second temperature threshold.

The heating member may be embedded in the pet device. The heating member may include a plurality of heating elements, wherein each of the plurality of heating elements is positioned at a different location with respect to the pet device.

The power switch may include a semiconductor switch, such as a triac. As such, the processing unit may be configured to activate the heating member in a proportional mode.

The system may also include at least one pressure sensing device in communication with the processing unit. The processing unit prevents activation of the heating member unless the pressure sensing device detects that an animal is adjacent at least a portion of the pet device.

Certain embodiments of the present invention provide a system that includes a birdbath having a water reservoir, and a heating control system configured to heat the water retained within the water reservoir. The heating control system includes a processing unit, at least one water temperature sensor position within the birdbath, a heating element embedded within at least a portion of the birdbath, and a semiconductor switch disposed within an electrical path between the heating element and the processing unit.

The at least one water temperature sensor is in communication with the processing unit, and is configured to detect a temperature of the water within the water reservoir. The heating element is configured to heat the water within the water reservoir.

The processing unit is configured to selectively activate and deactivate the heating element through the semiconductor switch based on a detected temperature. The processing unit is configured to selectively activate and deactivate the heating element in a proportional mode.

Figure 1:
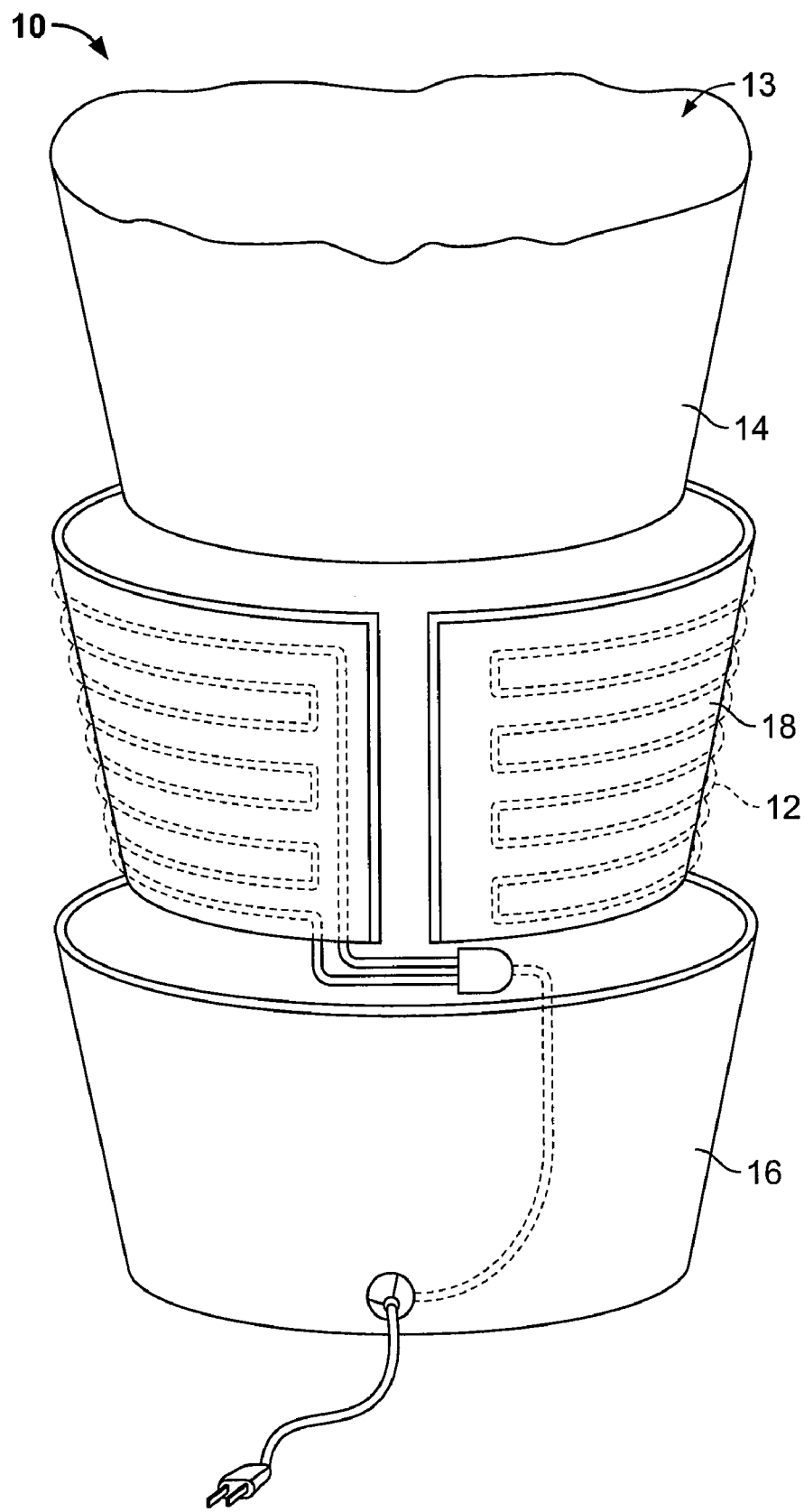
FIG. 1 illustrates a partial perspective cross-sectional view of a heating system according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a partial perspective cross-sectional view of a heating system 10 according to an embodiment of the present invention. The heating system 10 may be used with a birdbath, such as shown and described in U.S. Pat. No. 6,640,747, entitled "Bird Bath," which is hereby incorporated by reference in its entirety, a livestock water trough or tank, or the like.

The heating system 10 may include a heating element 12 embedded in a wall of a vessel or receptacle defining a water reservoir 13. For example, the vessel may include a double walled sidewall including an inner wall 14 and an outer wall 16. A heater 18, such as a foil heater, may be mounted between the inner and outer walls 14 and 16 in order to heat water within the reservoir 13.

While the heating element 12 is shown embedded between the inner and outer walls 14 and 16, embodiments of the present invention may alternatively include a heating element or device that is secured to an outer surface of one of the walls 14 and 16. Additionally, embodiments of the present invention may include a heating element or device that may be positioned within the reservoir 13. For example, embodiments of the present invention may utilize a deicing system such as shown and described in United States Patent Application Publication 2006/0096971, entitled "System and Method of Deactivating a Fluid Receptacle Deicer," which is hereby incorporated by reference in its entirety.

Figure 2:
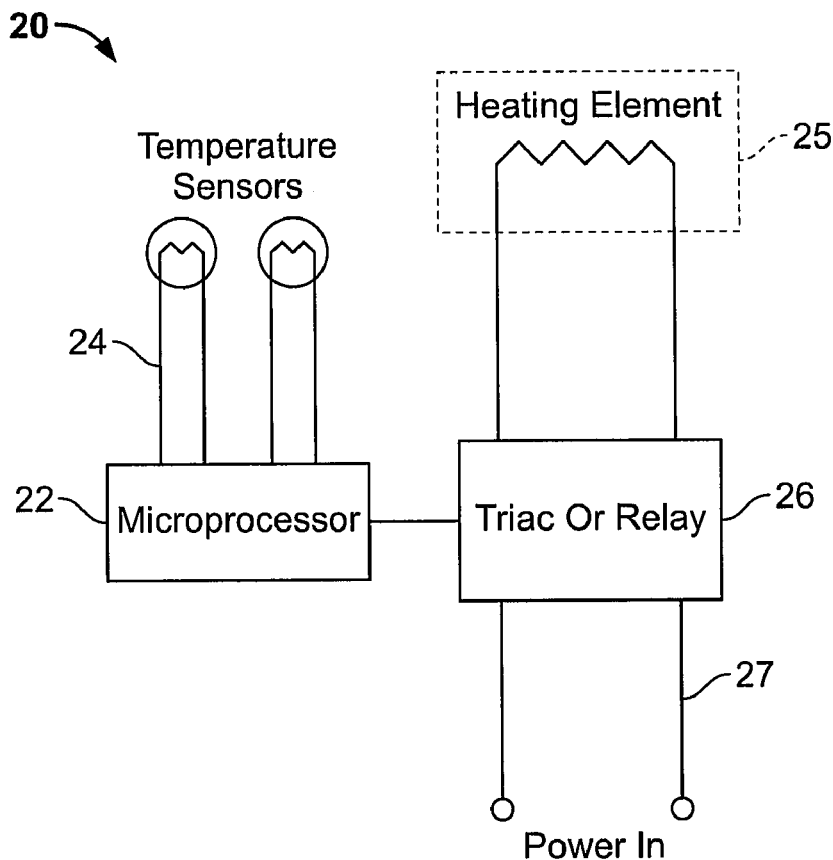
FIG. 2 illustrates a schematic representation of a heating control system according to an embodiment of the present invention.

FIG. 2 illustrates a schematic representation of a heating control system 20 according to an embodiment of the present invention. The heating control system 20 may be secured to the heating system 10 (shown in FIG. 1), or may be remotely located from the heating system 10 (except for the heating element 25, which is positioned proximate the reservoir 13) and connected to the heating control system 20 through insulated wires, or wireless connections.

The heating control system 20 includes a processing unit 22 (such as a microprocessor, microcontroller, an integrated circuit, such as an application specific integrate circuit (ASIC), or any other such electronic controller) electrically connected to at least one temperature sensor 24. The processing unit 22 is, in turn, electrically connected to a heating element 25, such as the heating element 12, shown and described in FIG. 1. A power switch 26, such as a semiconductor switch (e.g., a triac) and/or relay, may be disposed within the electrical path between the processing unit 22 and the heating element 25. A power source 27, such as a standard wall outlet, is electrically connected to the switch 26. The processing unit 22 activates or deactivates the switch 26 in order to selectively energize/de-energize the heating element 25 depending on the temperature detected by the temperature sensor(s) and relayed to the processing unit 22.

Turning now to the thermodynamic properties of water, the amount of heat required to raise the temperature of a body of water by a certain amount is given by equation (1):

$$\Delta Q = Mc\Delta T \tag{1}$$

where $\Delta Q$ is the amount of heat required, M is the mass of the body of water, c is the specific heat of the water, and $\Delta T$ is the change in temperature. Differentiating equation (1) with respect to time (t) gives equation (2):

$$dQ/dt = Mc(dT/dt) \tag{2}$$

The heat quantity dQ/dt is the rate of heat flow, H, so equation (2) can then be written as:

$$H = Mc(dT/dt) \quad (3)$$

Figure 3:
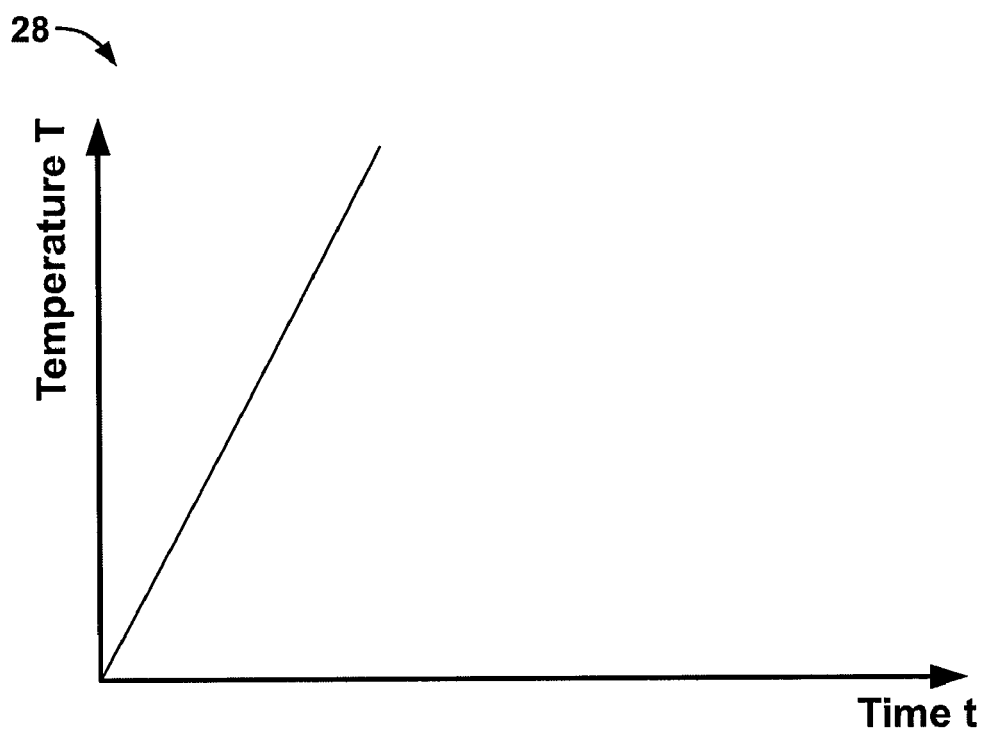
FIG. 3 illustrates a graph of the temperature of a body of water over. time when there is no heat loss.

Thus, for a given value of H, as shown by equation (3), the rise in temperature is linear over time. FIG. 3 illustrates a graph 28 of the temperature of a body of water over time when there is no heat loss.

Similarly, for heat transfer through a material, the rate of heat flow is given by equation (4):

$$H = -kA(dT/dx) \quad (4)$$

where H is the rate of heat flow, k is the thermal coefficient of the material, A is the cross-sectional area of the thermal path, and (dT/dx) is the rate of temperature change with regard to distance along the material. For a material of thickness X between two temperatures of $T_1$ and $T_2$, the heat flow is given by equation (5):

$$H = -kA(T_2-T_1)/X = -kA(\Delta T)/X \quad (5)$$

From equation (5) it is seen that, as $T_1$ approaches $T_2$, $\Delta T$ decreases and the rate of heat flow H decreases. In other words, the flow of heat from one side of the material to the other side slows down.

Figure 4:
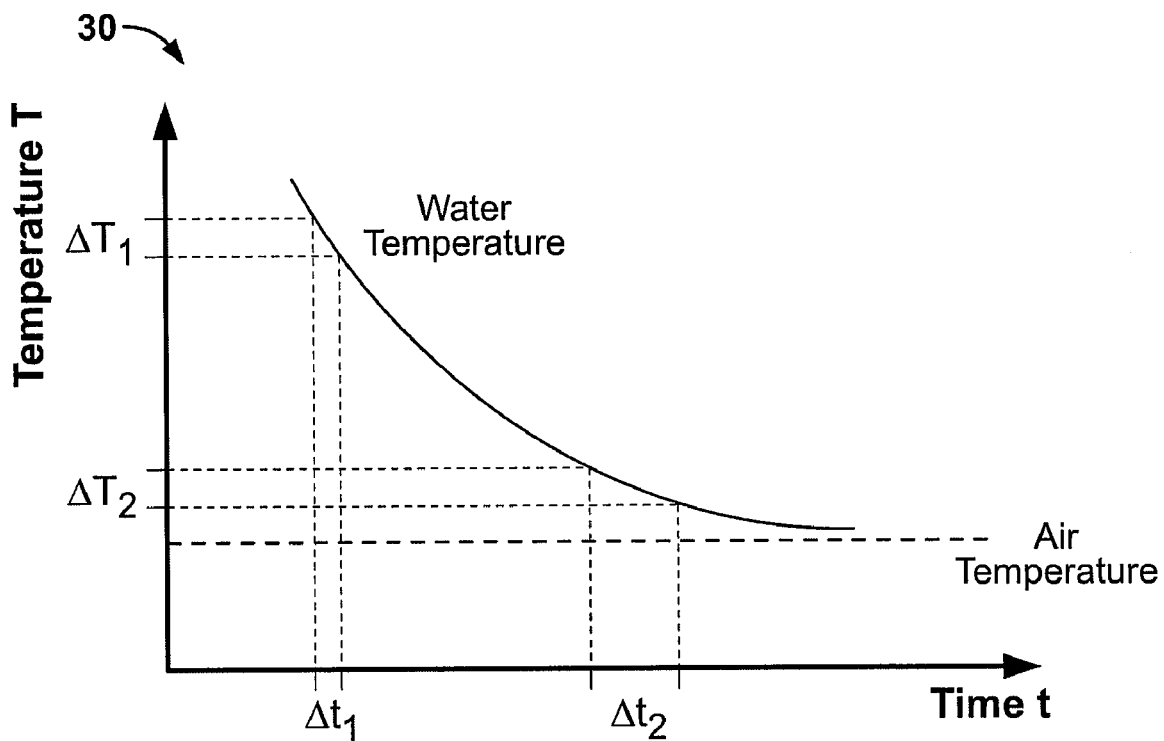
FIG. 4 illustrates a graph of the temperature of a body of water over time as heat is lost to the air.

FIG. 4 illustrates a graph 30 of the temperature of a body of water over time as heat is lost to the air. As shown in FIG. 2, $\Delta T_1$ is the same temperature difference as $\Delta T_2$, however, $\Delta T_1$ occurs at a higher temperature above the air temperature. The corresponding change in time for $\Delta T_1$ is $\Delta t_1$. The corresponding change in time for $\Delta T_2$ is $\Delta t_2$. Even though, as mentioned, the magnitudes of $\Delta T_1$ and $\Delta T_2$ are equal, the corresponding change in time for $\Delta T_1$ (i.e., $\Delta t_1$) is shorter than for the corresponding change in time for $\Delta T_2$ (i.e., $\Delta t_2$). That is, $\Delta t_2$ is greater than $\Delta t_1$. Thus, as the temperature of the water approaches the temperature of the air, the rate at which heat is lost decreases.

Figure 5:
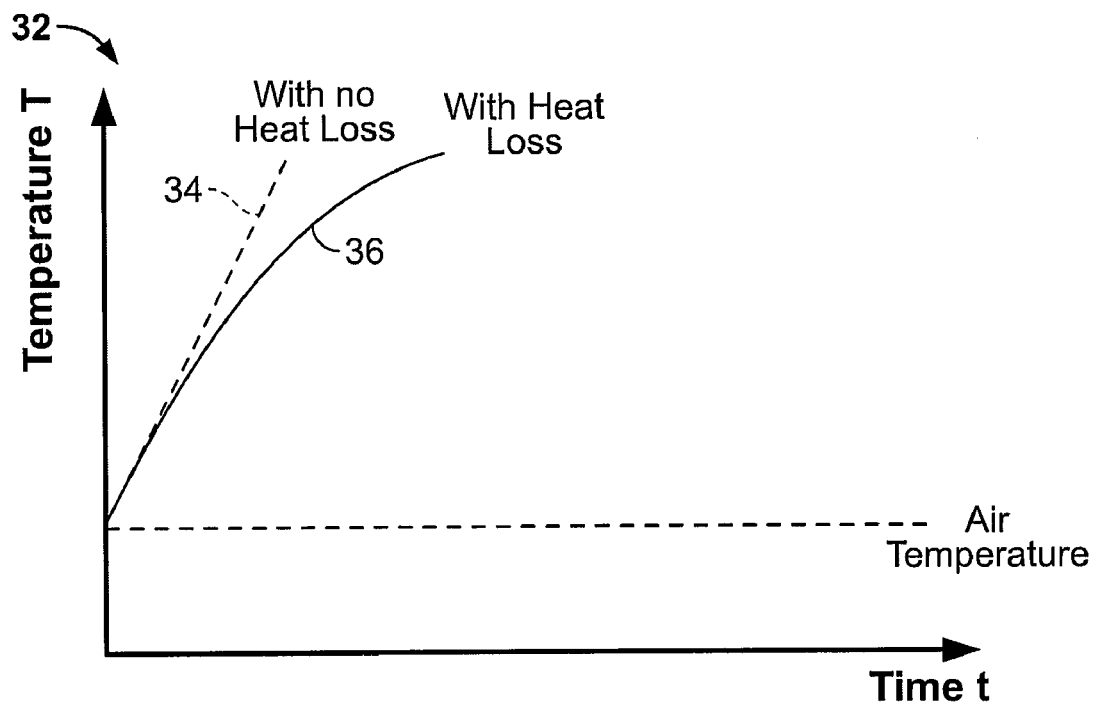
FIG. 5 illustrates a graph of the effect over time of heat loss on a body of water as heat is introduced into the water.

FIG. 5 illustrates a graph 32 of the effect over time of heat loss on a body of water as heat is introduced into the water. As discussed above, according to equation (3), as the water is heated, the temperature of the water 34 without accounting for heat loss to the air is linear. However, as discussed above, heat is lost to the air. Thus, the temperature of the water 36 accounting for heat loss to the air is not linear, because heat is lost at a faster rate as the temperature of the water rises above the temperature of the air.

Figure 6:
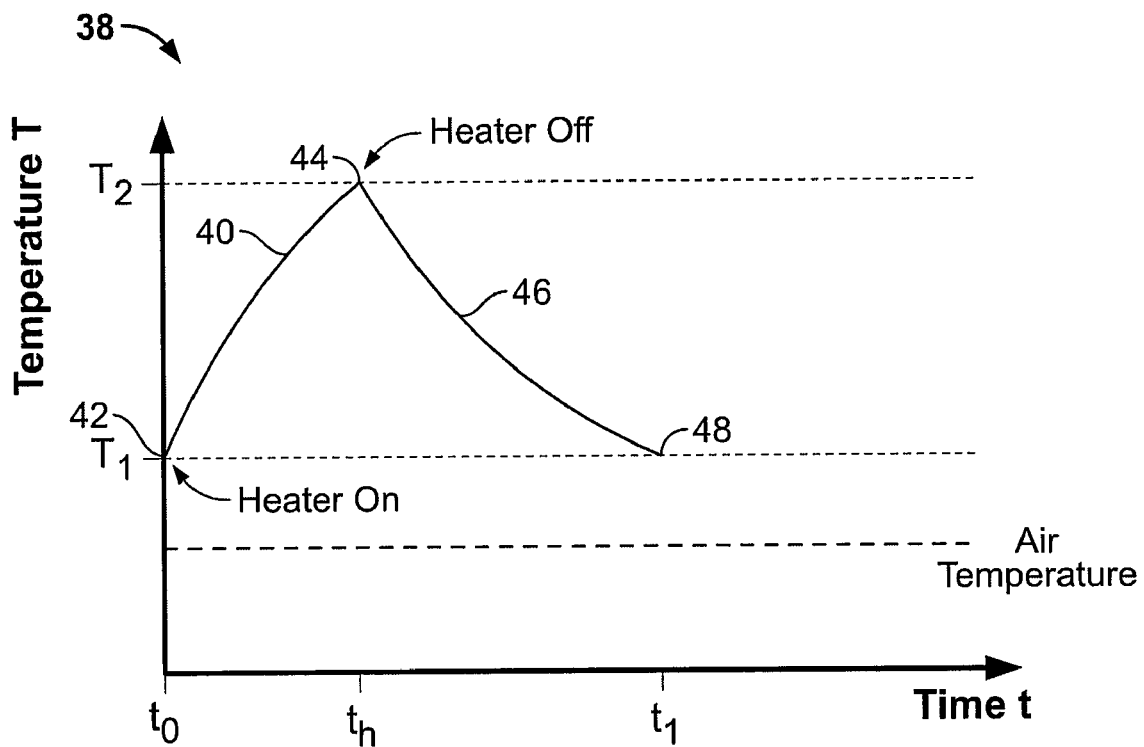
FIG. 6 illustrates a graph of the temperature of a body of water over time.

FIG. 6 illustrates a graph 38 of the temperature of a body of water over time. More particularly, FIG. 6 illustrates the temperature of the body of water 40 as it is heated, starting from a temperature $T_1$ until the temperature reaches a temperature $T_2$. The water is heated beginning at time $t_0$ 42 until time $t_h$ 44. The temperature of the water then cools 46 from temperature $T_2$ to temperature $T_1$ because the air temperature is below both temperatures $T_2$ and $T_1$. The amount of time for one cycle is $t_1$ 48, when the temperature returns to the activation temperature from which the cycle started.

Figure 7:
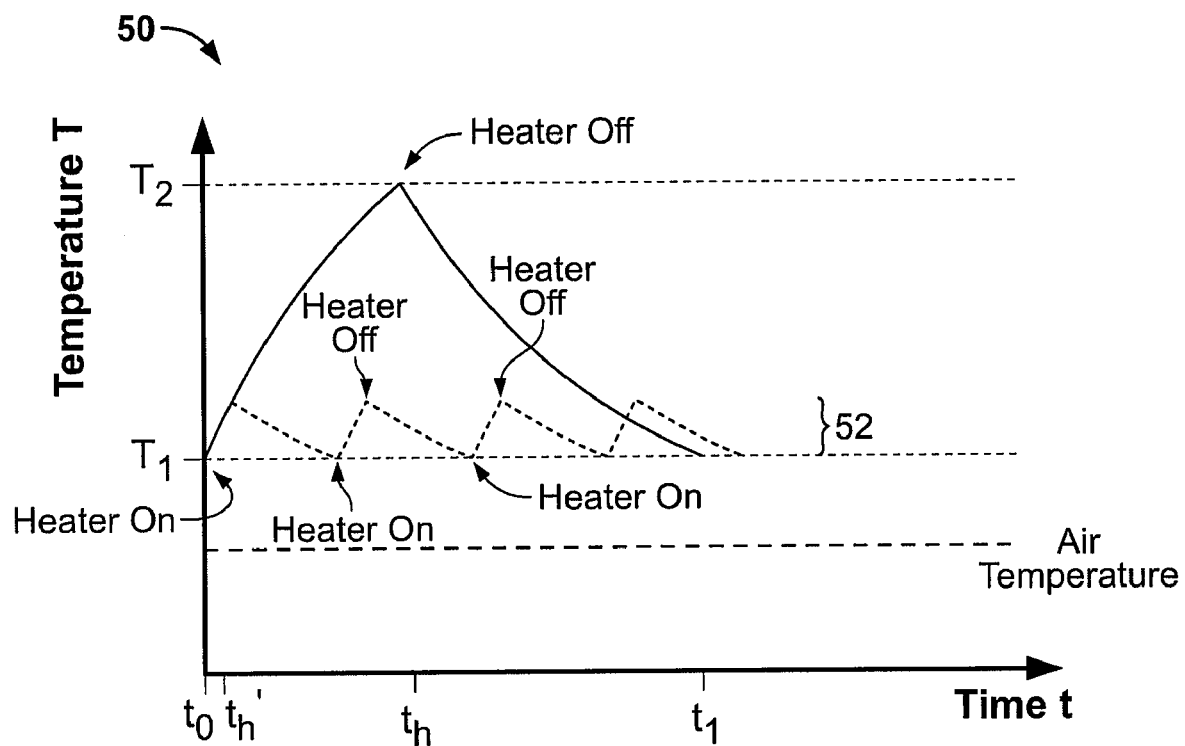
FIG. 7 illustrates a graph of the temperature of a body of water over time.

FIG. 7 illustrates a graph 50 of the temperature of a body of water over time. More particularly, FIG. 7 superimposes four heating cycles 52 over the graph 38 shown in FIG. 6. The heating cycles 52 heat the body of water to a temperature that is only 20% of $T_2$. The four heating cycles 52 take approximately the same time for the one cycle illustrated in FIG. 6, $t_1$. However, the four heating cycles 52 take advantage of the property discussed above, that the heat loss for each cycle in the four heating cycles 52 is slower relative to the heat loss 46 in the cycle from FIG. 6. Further, the temperature rise for time $t_h'$ is the steepest, and therefore most efficient, portion of the heating curve for the four heating cycles 52. Thus, the water temperature is cycled through a range in which it is heated the quickest and cools off the slowest. Therefore, the heater is on for less time in the four heating cycles 52.

As illustrated in FIG. 7, the amount of time to go through one cycle ($t_1$) of the heating/cooling period illustrated in FIG. 6 is approximately 3.7 cycles of the heating/cooling at the lower temperature. Thus, the amount of time that the heater is turned on for one of the heating cycles in the four heating cycles 52, $t_h'$, is only 12.5% of the original time $t_h$. Multiplying this figure by 3.7 gives 46.25%. Thus, while the water temperature is still maintained at or above $T_1$, decreasing the temperature range by 20% results in an improvement in efficiency of over 50%. So, for example, if it costs $100.00 to operate a heater for one month where the temperature is cycled between 40° F. and 60° F., it would cost only $46.25 to deice the same body of water simply by cycling the temperature between 40° F. and 45° F.

Referring again to FIGS. 1-2, the processing unit 22 may activate the switch 26 to complete a circuit to the heating element 25. When the switch 26 is activated, the heating element 25 energizes. The temperature sensor(s) 24 monitor the temperature of the water within the reservoir 13. The resolution of the temperature sensor(s) 24 may be selected to be on the order of 1° F. The processing unit 22 may be programmed such that the heating element 25 is energized when the water temperature approaches the freezing point.

For example, when the temperature sensor(s) 24 detect the temperature of the water within the reservoir 13 to be 33° F., the processing unit 22 may activate the switch 26 to energize the heating element 25. When the temperature of the water within the reservoir 13 reaches a predetermined warm temperature, the processing unit 22 deactivates the switch 26 so the heating element 25 is no longer energized. Once the warm temperature is sensed, the heating element 25 no longer heats fluid within the reservoir 13. The process then repeats.

Alternatively, instead of using a separate switch 26, the processing unit 22 of the heating control system 20 may be directly connected to the heating element 25, without a switch 26 therebetween. Thus, the processing unit 22 may directly activate and deactivate the heating element 25 based on the temperatures detected by the temperature sensor(s) 24 and relayed to the processing unit 22.

Each temperature sensor 24 may be a thermistor, thermometer, resistance temperature detector, or other such component that creates a signal that may be measured electronically as a function of temperature. Because the accuracy of the temperature sensor(s) 24 is much greater than that of mechanical thermostats, the water temperature may be controlled through a much smaller temperature range. Thus, the efficiency of the heating element 25 is increased. Additionally, because the heating control system 20 measures temperatures more precisely than mechanical thermostats, the heating element 25 does not need to be activated until the water temperature approaches a temperature that is close to the freezing point (as opposed to a thermostat, in which hysteresis causes the heater to activate in a range that is 5° F. to 7° F. from the freezing point).

Figure 8:
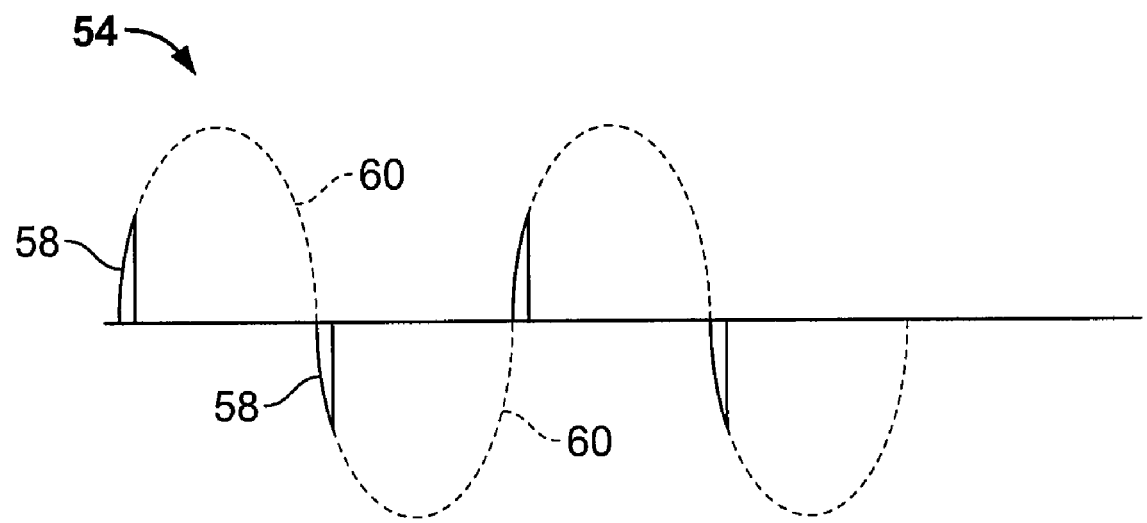
FIG. 8 illustrates a duty cycle for a heating element according to an embodiment of the present invention.
Figure 9:
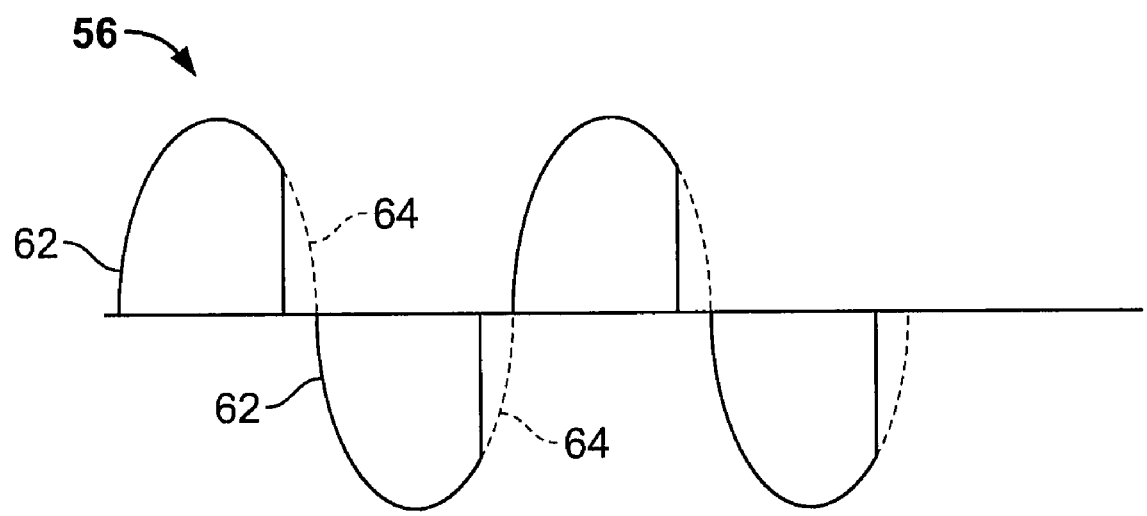
FIG. 9 illustrates a duty cycle for a heating element according to an embodiment of the present invention.

FIGS. 8 and 9 illustrate examples of duty cycles 54 and 56 for a heating element according to an embodiment of the present invention. Referring to FIGS. 1-2, and 8-9, by using a semiconductor switch, such as a triac, as the power switch 26, the processing unit 22 may also be operated in proportional mode. When operated in proportional mode, the switch 26 may activate for only a portion of the cycle of the AC current.

The heating element 25 may be activated for only a portion of the AC power cycle of the power provided by the power source 27. For example, the switch 26, such as a triac, may turn on for only 25% of the power cycle. As another example, the switch 26 may turn on for 50% of the power cycle. Proportional mode operation allows the heat output of the heating element 25 to be controlled. FIGS. 8 and 9 illustrate the heating element 25 being activated using switch 26, including a triac, for different portions of the power cycle.

FIG. 8 illustrates the duty cycle 54 for the heating element 25. More particularly, FIG. 8 illustrates a 10% duty cycle. The solid line portions 58 of the waveform indicate the portions of the power cycle over which the heating element 25 may be activated. The dashed line portions 60 of the waveform indicate the portions of the power cycle over which the heating element 25 may be deactivated.

FIG. 9 illustrates the duty cycle 56 for the heating element 25. More particularly, FIG. 9 illustrates a 75% duty cycle. The solid line portions 62 of the waveform indicate the portions of the power cycle over which the heating element 25 may be activated. The dashed line portions 64 of the waveform indicate the portions of the power cycle over which the heating element 25 may be deactivated.

In certain embodiments, proportional control may be achieved by activating and deactivating the heating element 25 in multiples of whole wavelengths of the AC power. For example, in order to achieve a 50% duty cycle, the heating element 25 may be activated every other cycle. Thus, instead of activating the heating element 25, for example, 10% of the power cycle to achieve a 10% duty cycle, the heating element 25 may be activated for one whole wavelength and deactivated for nine wavelengths to achieve a similar effect. This mode of proportional operation may be advantageous because of the relatively high currents that may be involved to operate the heating element 25. When the heating element 25 is activated and/or deactivated at the nodes of the power cycle (e.g., at whole or half wavelength intervals), large transients that can cause, for example, radio interference, may be avoided.

As more heat is required for the water within the reservoir 13, the switch 26 (such as a triac) will be active for more of the cycle, such as shown in FIG. 9. The net effect is proportional control of the heat output. Thus, the temperature of the water within the reservoir 13 may be maintained close to a set point. Alternatively, the processing unit 22 may operate a relay within the switch 26 to selectively turn on/off the power to the heating element 25.

In addition to more accurately controlling the heating cycle, the processing unit 22 allows for inputs relating to over-temperature conditions. For example, additional temperature sensor(s) may monitor the heating element 25 in order to terminate the power supply to the heating element 25 if it overheats. Additionally, the system 20 may include sensor(s) that are configured to prevent the heating element 25 from activating at all unless water is present. For example, United States Patent Application Publication 2006/0096971 describes a sensing unit configured to detect a change in at least one of capacitance and resistivity based on fluid changes in order to deactivate a heating element.

Figure 10:
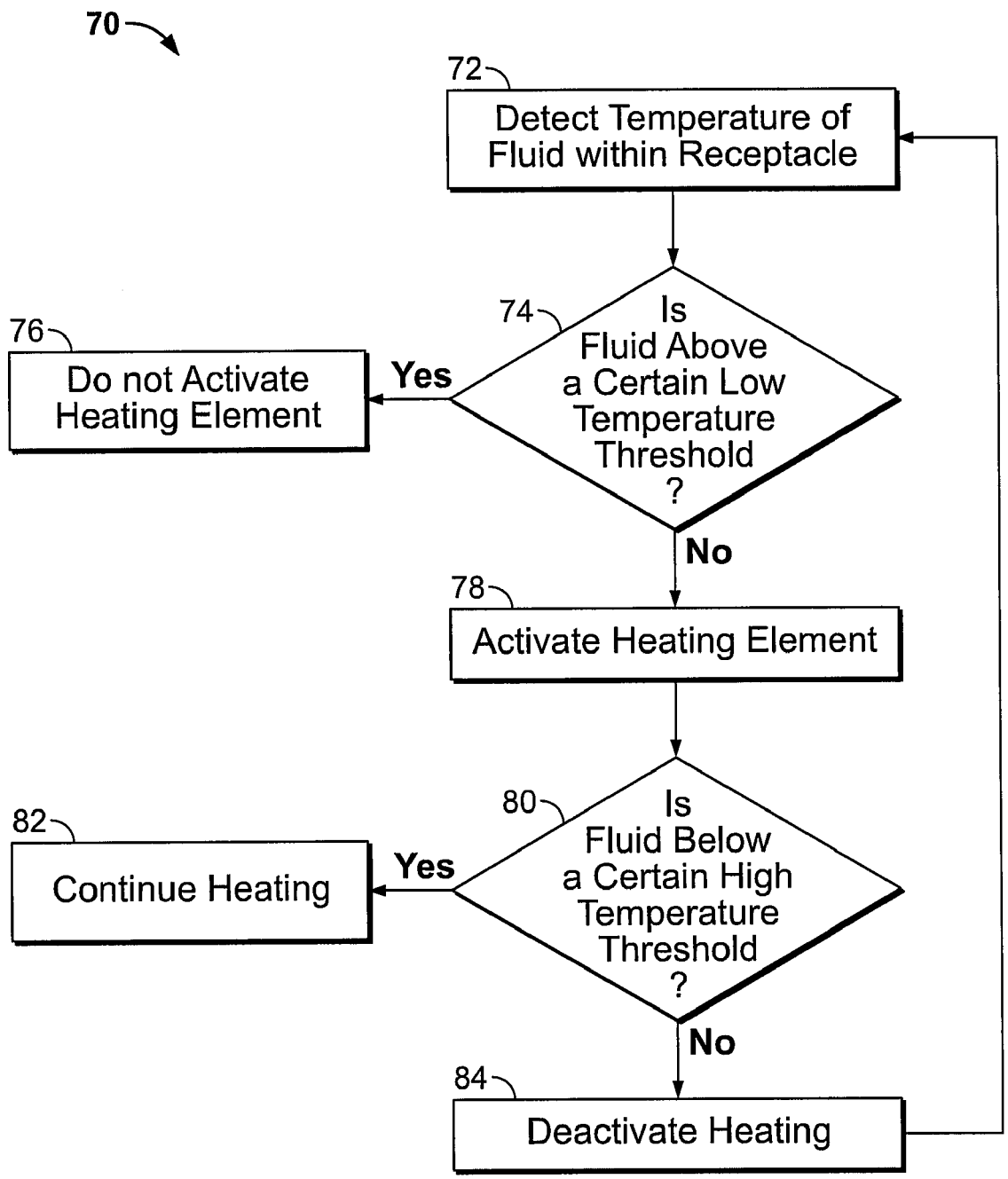
FIG. 10 illustrates a flow chart of a method of controlling a heating element of a water receptacle according to an embodiment of the present invention.

FIG. 10 illustrates a flow chart 70 of a method of controlling a heating element of a water receptacle according to an embodiment of the present invention. At 72, the temperature of fluid, such as water within a water receptacle, is detected, such as through the temperature sensor(s) discussed above. At 74, the processing unit determines whether the fluid within the receptacle is above a certain temperature threshold. Because embodiments of the present invention use temperature sensors that are more sensitive to temperature than conventional mechanical thermostats, the threshold temperature may be very close to the freezing point. If the temperature of the fluid is above the threshold, then, at 76, the processing unit does not activate the heating element. If, however, the detected temperature is below the temperature threshold, then the processing unit activates the heating element at 78.

The temperature sensor(s) continue to monitor the temperature of the fluid within the fluid receptacle. The processing unit determines whether the temperature of the fluid is below another temperature threshold at 80. If the temperature of the fluid is below this threshold, the heating element continues to heat the fluid at 82. If, however, the temperature of the fluid is below this threshold, the heating element is deactivated at 84, and the entire process repeats.

Figure 11:
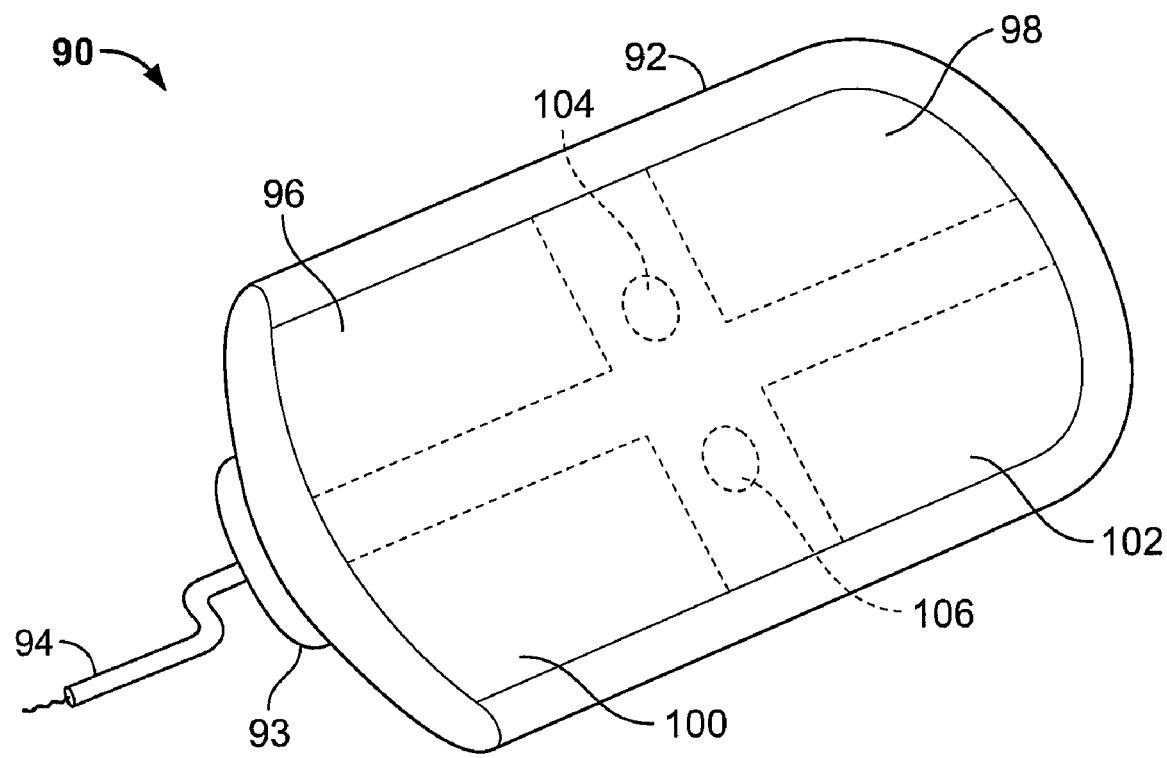
FIG. 11 illustrates an isometric view of a heated pet device according to an embodiment of the present invention.

FIG. 11 illustrates an isometric view of a heated pet device 90 according to an embodiment of the present invention. The heated pet device 90 includes a pet resting member 92, such as a bed, mat, or blanket, which includes a heating member 93 positioned therein or thereon. The heating member 93 may be positioned between layers of the pet resting member 92, and may include an electrically insulated resistance wire, or a foil or vinyl protected sheet that is sandwiched between cushioning layers. The heating member 93 may include the heating element 25 (shown in FIG. 2) and is connected to a heating control system, such as the heating control system 20 (shown in FIG. 2) through an insulated wire 94, or wireless connection. Optionally, the heated pet device 90 may be a pet clothing item, such as a sweater, that includes a battery pack as a source of power and a heating control system integrated on or within the clothing item.

Referring to FIGS. 2 and 11, the processing unit 22 monitors ambient air temperature through the temperature sensor(s) 24. For example, the temperature sensor(s) 24 may be digital thermometers, or other such sensing devices described above. Additionally, the processing unit 22 may be electrically connected to an additional temperature sensor 24 embedded in the pet resting member 92 that is configured to detect the temperature of an animal resting on the pet resting member 92. For example, the processing unit 22 may be programmed to correlate a temperature at the surface of the pet resting member 92 with that of an animal resting on the pet resting member 92 (i.e., a first temperature if no pet is on the pet resting member 92, deviations from the first temperature indicate the presence of an object on the pet resting member 92). Optionally, the temperature sensor 24 located on or within the pet resting member 92 may directly detect the temperature of an animal resting on the pet resting member 92. Further, the temperature sensor 24, or an additional temperature sensor, may be configured to detect the temperature of the heating element 25 itself.

The processing unit 22 is configured to selectively activate/deactivate the heating member 93 similar to the systems and methods described above with respect to FIGS. 1-10. For example, if the processing unit 22 determines that the ambient air temperature is below a certain temperature, the processing unit 22 may activate the heating member 93 to warm the pet resting member 92. When the ambient air temperature exceeds a high temperature threshold, the processing unit 22 may then deactivate the heating member 93. Similarly, if the processing unit 22 determines that the temperature of the animal resting on the pet resting member 92 is above a certain temperature, the processing unit 22 may deactivate the heating member 93. Also, if the temperature of the heating member 93 itself is above a certain high temperature threshold, the processing unit 22 may deactivate the heating member 93. In general, the processing unit 22 may control the heating element such as described above with respect to FIGS. 1-10, except that, instead of detecting the temperature of fluid within a receptacle, the processing unit 22 detects the temperature of ambient air, the animal resting on the pet resting member 92, and/or the heating member 93.

Additionally, instead of a single heating member 93, the system may include multiple heating elements 96, 98, 100, and 102 in electrical communication with the processing unit 22. By using multiple heating elements 96, 98, 100, and 102 positioned at different areas of the pet resting member 92, such as a pet mat or sweater, the processing unit 22 may selectively adjust the amount of heat that is delivered to any single area. For example, the processing unit 22 may activate the heating element 98, while deactivating the other heating elements depending on the temperature of the pet and/or the other heating elements.

Additionally, the processing unit 22 may receive signals from sensors 104 and 106 that detect whether an animal is present before activating the heating element. For example, the sensors 104 and 106 may include potentiometers, accelerometers, digital scales, and/or pressure sensing devices that are configured to detect the presence of a pet (such as by detecting a difference in weight at the surface of the pet resting member 92).

Thus, embodiments of the present invention provide efficient systems and methods of heating water within a water receptacle, such as a birdbath. Embodiments of the present invention also provide a system and method for accurately controlling the temperature cycle of a heating device. Additionally, embodiments of the present invention provide an efficient system and method for monitoring and adjusting heated pet devices.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A system, comprising:
   a fluid receptacle having a fluid reservoir, said fluid reservoir configured to retain fluid; and
   a heating control system configured to heat the fluid retained within said fluid reservoir, said heating control system comprising:
   a processing unit;
   at least one fluid temperature sensor positioned on or within at least a portion of said fluid receptacle; said at least one fluid temperature sensor being in communication with said processing unit, said at least one fluid temperature sensor being configured to detect a temperature of the fluid within said fluid reservoir;
   at least one air temperature sensor in communication with said processing unit, wherein said processing unit is configured to selectively activate and deactivate said heating element based on a temperature of ambient air;
   a heating element configured to heat the fluid within said fluid reservoir; and
   a power switch disposed within an electrical path between said heating element and said processing unit, said processing unit being configured to activate said heating element through said power switch when said at least one fluid temperature sensor detects that the temperature of the fluid within said fluid reservoir is below a first threshold, and said processing unit being configured to deactivate said heating element through said power switch when said at least one fluid temperature sensor detects that the temperature of the fluid within said fluid reservoir is above a second threshold.

2. The system of claim 1, wherein said fluid receptacle is a bird bath.

3. The system of claim 1, wherein said heating element is embedded in said fluid receptacle.

4. The system of claim 3, wherein said fluid receptacle comprises an inner receptacle and an outer receptacle, wherein said heating element is sandwiched between said inner receptacle and said outer receptacle.

5. The system of claim 1, wherein said power switch comprises a semiconductor switch.

6. The system of claim 5, wherein said semiconductor switch comprises a triac.

7. The system of claim 6, wherein said processing unit is configured to activate said heating element in a proportional mode.

8. The system of claim 1, further comprising at least one heating element temperature sensor in communication with said processing unit, wherein said processing unit is configured to prevent said heating element from activating based on a temperature of said heating element.

9. The system of claim 1, further comprising at least one fluid level sensor in communication with said processing unit, wherein said processing unit is configured to prevent said heating element from activating based on a fluid level within said fluid reservoir.

10. A pet warming system, comprising:
    a pet device; and
    a heating control system secured on and/or within said pet device, said heating control system configured to heat said pet device, said heating control system comprising:
    a processing unit;
    at least one temperature sensor in communication with said processing unit, said at least one temperature sensor being configured to detect a temperature of one or both of ambient air and/or a pet adjacent said pet device;
    a heating member configured to heat said pet device; and
    a power switch disposed within an electrical path between said heating member and said processing unit, said processing unit being configured to activate said heating member through said power switch when said at least one temperature sensor detects that the temperature is below a first threshold, and said processing unit being configured to deactivate said heating member through said power switch when said at least one temperature sensor detects that the temperature is above a second threshold.

11. The system of claim 10, wherein said pet device is one of a pet mat, pet bed, or blanket.

12. The system of claim 10, wherein said pet device is a pet sweater.

13. The system of claim 10, wherein said heating member is embedded in said pet device.

14. The system of claim 10, wherein said heating member comprises a plurality of heating elements, wherein each of said plurality of heating elements is positioned at a different location with respect to said pet device.

15. The system of claim 10, wherein said power switch comprises a semiconductor switch.

16. The system of claim 15, wherein said semiconductor switch comprises a triac.

17. The system of claim 16, wherein said processing unit is configured to activate said heating member in a proportional mode.

18. The system of claim 10, further comprising at least one pressure sensing device in communication with said processing unit, wherein said processing unit prevents activation of said heating member unless said pressure sensing device detects that an animal is adjacent at least a portion of said pet device.

19. A system, comprising:
- a birdbath having a water reservoir, said water reservoir configured to retain water; and
- a heating control system configured to heat the water retained within said water reservoir, said heating control system comprising:
- a processing unit;
- at least one water temperature sensor positioned within said birdbath; said at least one water temperature sensor being in communication with said processing unit, said at least one water temperature sensor being configured to detect a temperature of the water within said water reservoir;
- a heating element embedded within at least a portion of said birdbath, said heating element configured to heat the water within said water reservoir;
- at least one heating element temperature sensor in communication with said processing unit, wherein said processing unit is configured to prevent said heating element from activating based on a temperature of said heating element; and
- a semiconductor switch disposed within an electrical path between said heating element and said processing unit, said processing unit being configured to selectively activate and deactivate said heating element through said semiconductor switch based on a detected temperature, said processing unit being configured to selectively activate and deactivate said heating element in a proportional mode.

20. The system of claim 19, further comprising at least one air temperature sensor in communication with said processing unit, wherein said processing unit is configured to selectively activate and deactivate said heating element based on a temperature of ambient air.

21. The system of claim 20, further comprising at least one water level sensor in communication with said processing unit, wherein said processing unit is configured to prevent said heating element from activating based on a water level within said water reservoir.

* * * * *